United States Patent [19]

Howell

[11] 4,414,785
[45] Nov. 15, 1983

[54] CONSTRUCTION FRAMING ANCHOR

[76] Inventor: Venice T. Howell, 1425 Cabrillo Ave., Burlingame, Calif. 94010

[21] Appl. No.: 209,693

[22] Filed: Nov. 24, 1980

[51] Int. Cl.³ .......................... E02D 27/00; E04B 1/38
[52] U.S. Cl. .................................... 52/169.1; 52/713; 403/9; 403/191; 403/232.1
[58] Field of Search ................ 52/712, 713, 714, 715, 52/169.1; 403/3, 191, 232.1, 230, 406

[56] References Cited

U.S. PATENT DOCUMENTS 3,423,898  1/1969  Tracy et al. ........................ 52/713
3,665,669  5/1972  Huber ................................. 52/169.1
3,727,358  4/1973  Howell ............................... 52/169.1

Primary Examiner—John E. Murtagh
Assistant Examiner—Richard E. Chilcot, Jr.
Attorney, Agent, or Firm—Robert W. Dilts

[57] ABSTRACT

A construction framing anchor (22) for mounting vertical underpinning (20) to a foundation (12) having a sloped top surface or footing (14), the framing anchor (22) including a lower inclined plate (24) connected to the foundation (12), an upper horizontal plate (26) having the lower end of the underpinning (20) secured thereto, and locking means (46) to integrally lock the lower inclined plate (24) to the upper horizontal plate (26) to define a truss (48) to support the underpinning (20) and the load of the structure supported thereby.

4 Claims, 11 Drawing Figures

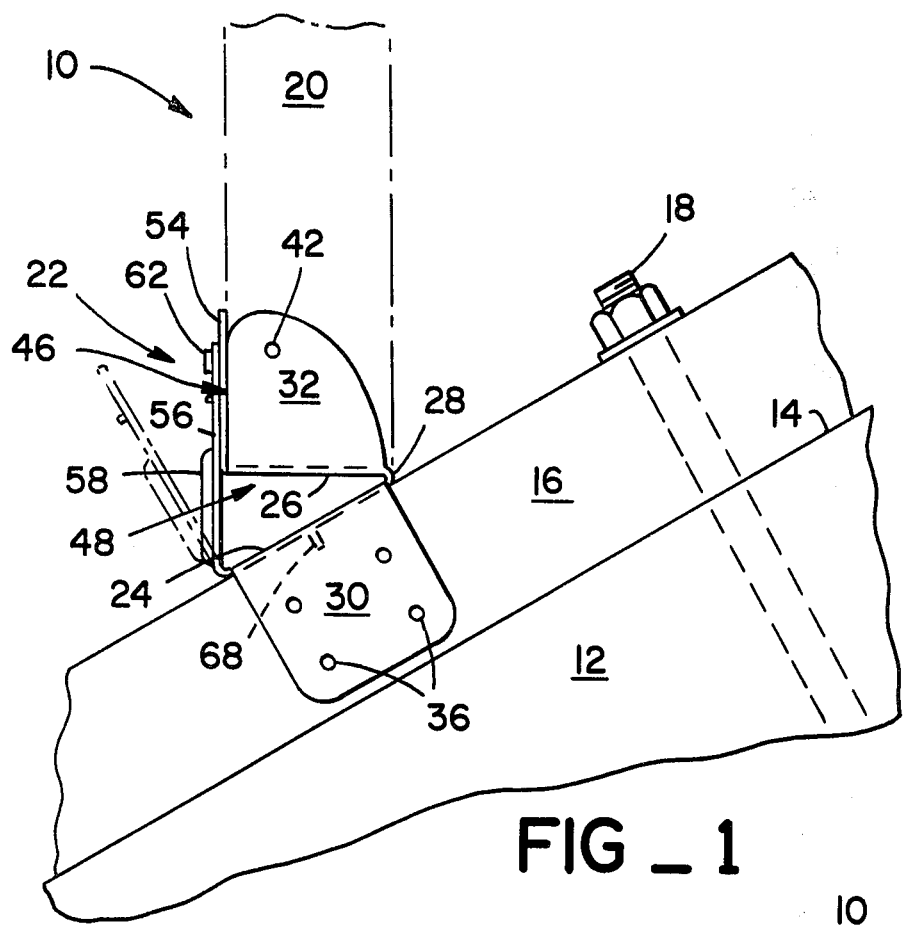
FIG_1
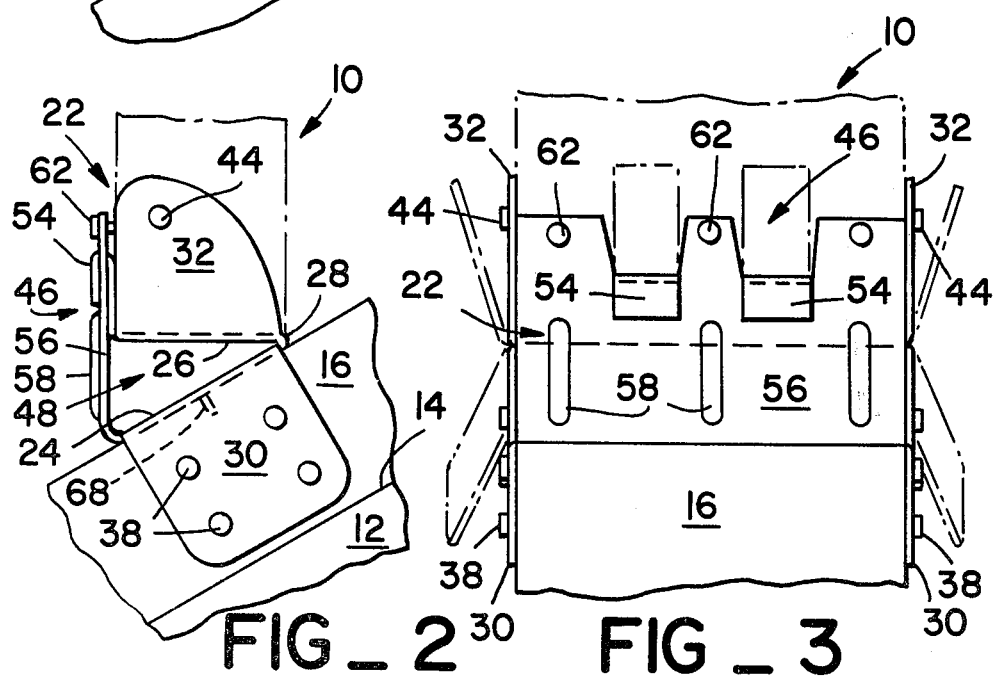
FIG_2   FIG_3

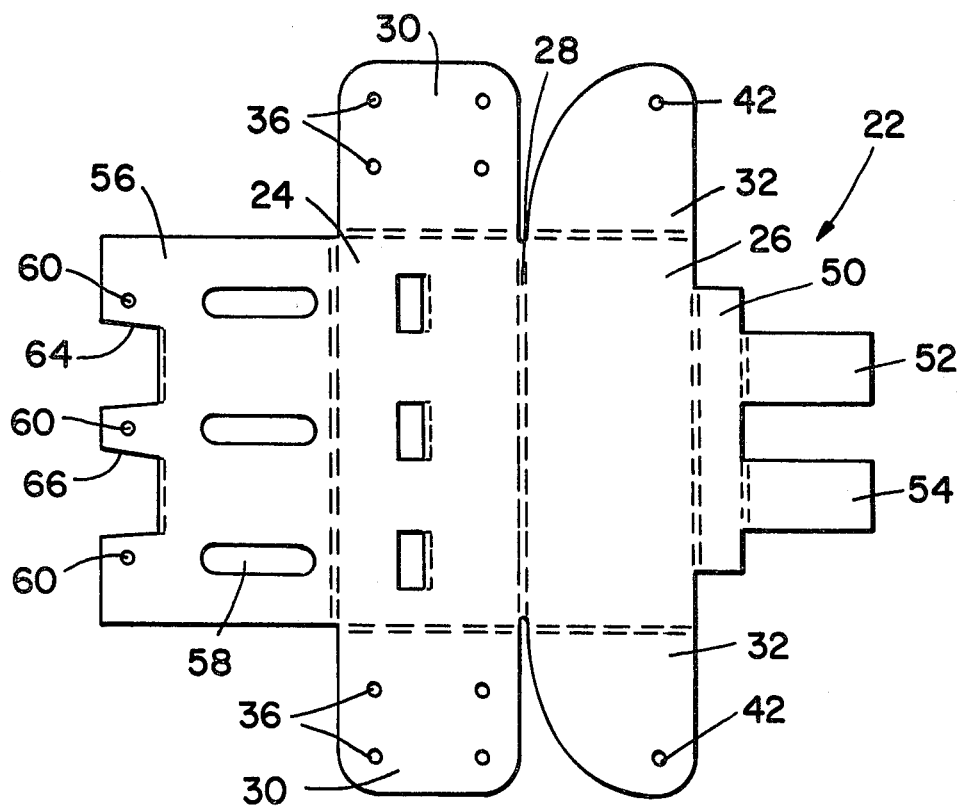
FIG_4
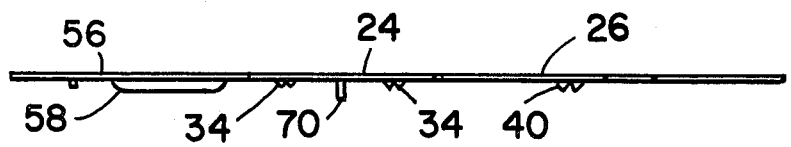
FIG_5
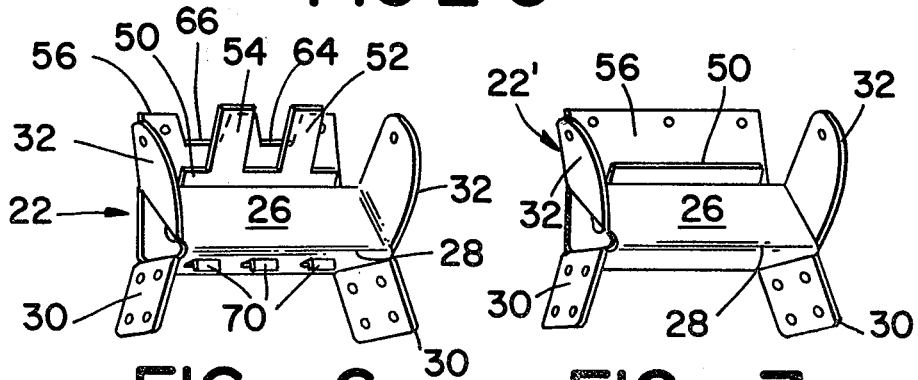
FIG_6  FIG_7

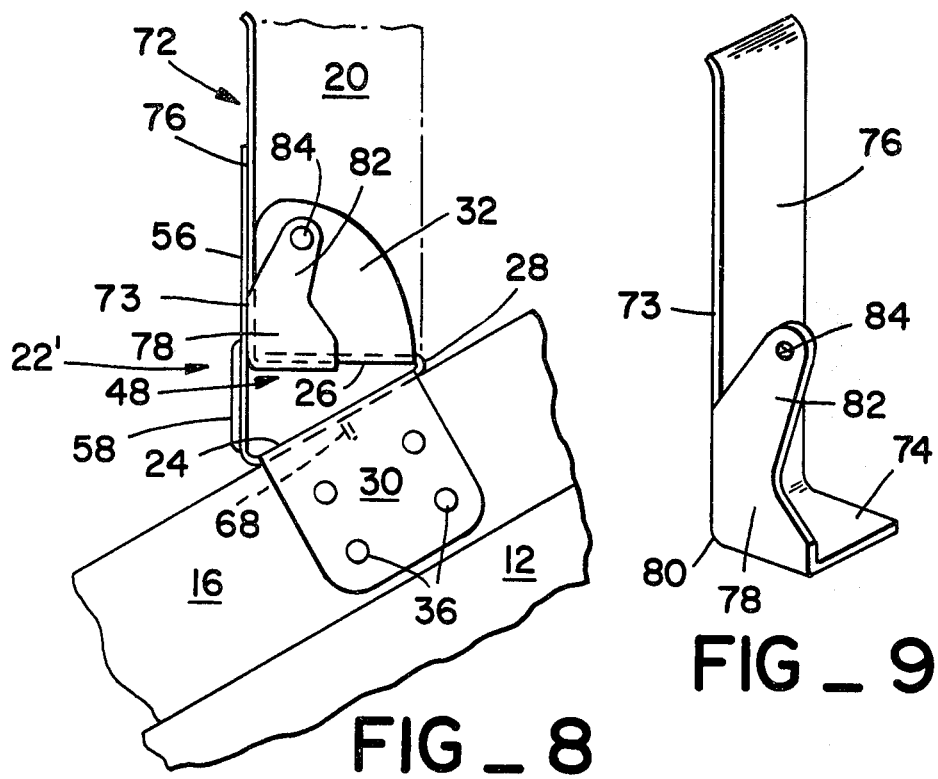
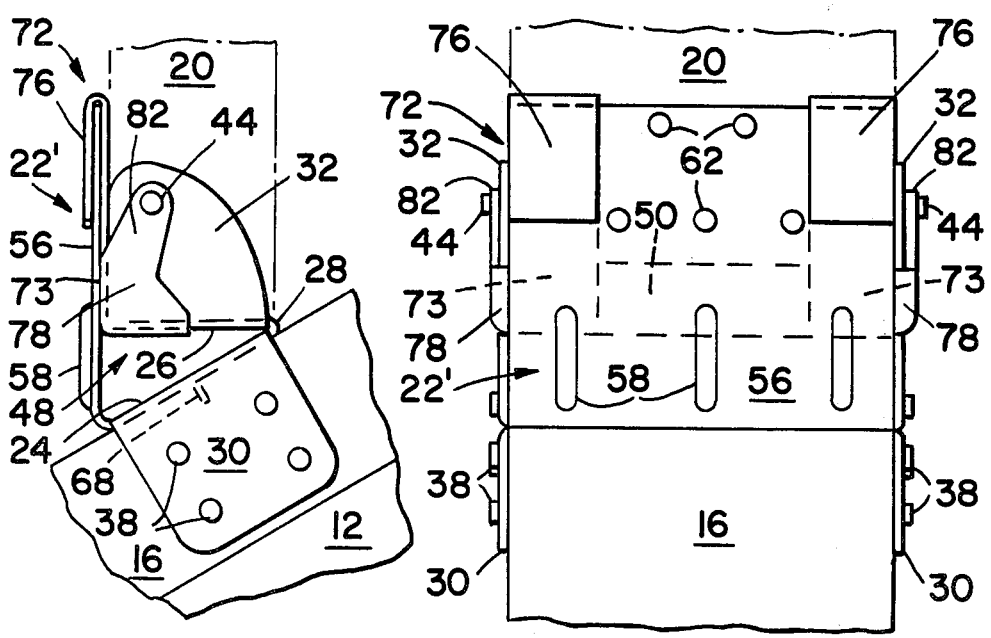

CONSTRUCTION FRAMING ANCHOR

BACKGROUND OF THE INVENTION

This invention relates generally to improvements in building construction and more particularly to framing anchors which are used to attach wood studs or vertical framing members, generally referred to as underpinning, to a concrete foundation. Typically, framing anchors of this type are used to attach the base or lower end of such studs to a wooden sill which is secured to the upper surface of a concrete foundation or footing, and are to constructed as to allow the studs or underpinning to be supported in a vertical position, while the concrete foundation and the sill may be at various angles to the vertical other than perpendicular thereto, the foundation or footing defining a sloping top surface corresponding generally to the slope of the ground at which the footing is disposed.

The construction and use of such a framing anchor is disclosed in U.S. No. 3,727,358, issued to Venice T. Howell, Apr. 17, 1973. Howell discloses a framing anchor for securing underpinning to sloped foundation sills which eliminates stepping the top of the foundation otherwise necessary to mount the underpinning in the vertical position. The framing anchor includes a generally horizontal upper plate having the lower end of the vertical underpinning resting thereon and a lower inclined plate resting on the top of the sill. The upper and lower plates are joined together at one side thereof by a flexible interconnecting section so that the underpinning may be positioned and held vertically, even though the top surface of the foundation may be varied in its angle of slope. Both the lower inclined plate and the upper horizontal plate are secured to the sill and the vertical underpinning respectively by nails extending through respective upwardly extending and downwardly extending flanges and into the wooden members. The underpinning is held in vertical alignment by a flange secured to the inclined plate and extending upwardly therefrom and along one side of the stud. As hereinbefore described, holes are provided in the flange for receiving nails which are driven therethrough and into the wooden underpinning.

Because wood has a tendency to split and weaken as nails are driven into it, especially near the end of a wooden section, it is undesirable to weaken the underpinning by using an excessive number of nails to secure the lower end thereof to the framing anchor. Moreover, by reducing the number of nails used in the structure, not only will a materials cost reduction be achieved, but also a labor cost reduction will be realized reflecting a reduction in the time required to mount each underpinning to the foundation. However, it is also necessary to use a quantity of nails sufficient to adequately support the vertical underpinning on the sill and the load of the building supported thereby.

The foregoing illustrates limitations of the known prior art. Thus, it is apparent that it would be advantageous to provide an alternative to the prior art.

SUMMARY OF THE INVENTION

According to the teachings of the present invention, this is accomplished by providing an improvement to prior art framing anchors in the form of locking means to integrally lock the lower inclined plate of the framing anchor to the upper horizontal plate thereof independently of the underpinning so that the number of nails required to secure the lowerend of the underpinning to the framing anchor is reduced, yet, at the same time the structural strength of the vertical underpinning and the framing anchor mounting on the sill is not impaired.

The foregoing and other advantages will become apparent from the following detailed description of the invention when considered in conjunction with the accompanying drawings showing preferred embodiments of the invention.

BRIEF DESCRIPTION OF THE DRAWINGS

In the drawings:

FIG. 1 is an end elevational view of a building construction having a sloping foundation and sill and a vertical underpinning supported thereon by a framing anchor constructed in accordance with the present invention;

FIG. 2 is an end elevational view of the building construction of FIG. 1 illustrating the upper and lower portions of the framing anchor locked together;

FIG. 3 is a side elevational view of the building construction of FIG. 2;

FIG. 4 is a plan view of a stamped blank for a framing anchor constructed in accordance with the present invention;

FIG. 5 is an end view of the stamped blank of FIG. 4;

FIG. 6 is an isometric view of the stamped blank of FIGS. 4 and 5 shaped into a framing anchor for securing vertical underpinning to a foundation sill;

FIG. 7 is an isometric view of an alternate embodiment of a framing anchor constructed in accordance with the present invention;

FIG. 8 is an end elevational view of a building construction having a sloping foundation and sill and a vertical underpinning supported thereon by the alternate embodiment of the framing anchor illustrated in FIG. 7;

FIG. 9 is an isometric view of a clip for locking together the upper and the lower portions of the framing anchor of FIG. 7;

FIG. 10 is an end elevational view of the building construction of FIG. 8 illustrating the upper and the lower portions of the framing anchor locked together; and FIG. 11 is a side elevational view of the building construction of FIG. 10.

DETAILED DESCRIPTION OF THE PREFERRED EMBODIMENTS

Referring to the first embodiment of the present invention, as shown in FIGS. 1 to 6 inclusive, there is disclosed a building construction indicated generally by the numeral 10 and including a foundation 12 having a sloping top surface or footing 14 corresponding generally to the slope of the ground in which the foundation is disposed. As illustrated, the footing has a sloping sill 16 mounted thereon by the usual anchor bolts 18. A vertical framing member or underpinning 20 extends upwardly relative to the foundation, and a framing anchor 22 is used for securing the lower end of the underpinning to the foundation in the manner hereinafter described.

In its structural features, the framing anchor 22 defines a lower inclined plate 24 resting on the top of the sill 16 and an upper horizontal plate 26 having the lower end of the vertical underpinning 20 resting thereon. The framing anchor is made adjustable by a flexible interconnecting section 28 joining the lower and upper plates together at one side of the framing anchor, so that the lower and upper plates may rest against the sill and the underpinning respectively, and the underpinning may be held in a vertical position, even though the sill may be varied in its angle of slope.

The lower plate 24 of the framing anchor 22 is provided with a pair of spaced depending flanges 30 that straddle the sill 16 and are secured to the latter. Likewise, the upper plate 26 is provided with a pair of spaced upwardly-projecting flanges 32 that straddle the vertical underpinning 20 and are secured to the latter.

The depending flanges 30 of the framing anchor 22 that straddle the sill 16 have tubular projections 34 (see FIG. 5) on their inner faces that may be hammered into the sill to anchor the lower plate 24 in place, these projections defining holes 36 through which nails 38 may be driven into the sill to secure these depending flanges thereto.

In a like manner, the upwardly-projecting flanges 32 on the upper plate 26 that straddle the vertical underpinning 20 have tubular projections 40 (see FIG. 5) on their inner faces that may be hammered into the underpinning to anchor the upper plate in place, these projections defining holes 42 through which nails 44 may be driven into the underpinning to secure these flanges thereto.

As clearly illustrated in FIGS. 1, 3 and 6, the depending flanges 30 are shaped in the factory to diverge downwardly with respect to one another prior to being hammered against the sill 16, so that they may be inserted over the sill without obstruction by the projections 34. In a like manner, the upwardly-projecting flanges 32 are shaped in the factory to diverge upwardly with respect to one another prior to being hammered against the underpinning 20, so that the underpinning may be inserted therebetween without obstruction by the projections 40.

It will be noted that the lower inclined plate 24 and the upper horizontal plate 26 are arranged in an adjustable angular relation with one another. Therefore, the framing anchor 22 includes means 46 for integrally locking the lower plate to the upper plate independently of the underpinning to define a truss 48 for supporting the underpinning and the load of the building supported thereby.

Referring to FIGS. 4 and 6, the locking means 48 may be seen to include a first inwardly extending flange 50 formed integrally with the upper horizontal plate 26 on the side thereof opposite the flexible interconnecting section 28, the flange including a pair of upwardly extending tabs 52 and 54 formed integrally therewith. As best shown in FIGS. 1-3, upon assembly the flange and the tabs have the lower end of the underpinning 20 abutted thereagainst as an aid in correctly centering the underpinning relative to the upper plate.

The locking means further includes a second upwardly extending flange 56 formed integrally with the lower inclined plate 24 on the side thereof opposite the flexible interconnecting section 28. Referring to FIG. 1, the second flange is factory-made to extend upwardly at an angle away from the underpinning prior to being hammered thereagainst, so that the underpinning may be inserted into the framing anchor without being obstructed thereby. After the underpinning is positioned on the upper horizontal plate adjacent the first upwardly extending flange 50 and tabs 52, 54, the second flange is hammered against the first upwardly extending flange 50 adjacent thereto and adjacent the underpinning.

The second flange 56 may have ribs 58 formed on its lower portion to reinforce the second flange just beneath the lower end of the underpinning, as shown in FIGS. 1-3. The second flange is fashioned with prepunched holes 60 through which nails 62 may be driven into the underpinning, as disclosed in FIGS. 1 and 2. The flange further defines a pair of slots 64 and 66, each of the slots being positioned in a juxtaposed relationship with one of the tabs 52 and 54. Thereafter, each of the tabs is bent into the slot adjacent thereto and over the second upwardly extending flange 56 integrally locking the upper horizontal plate 26 to the lower inclined plate 24 forming the load supporting truss 48.

Referring to FIGS. 1 and 2, the sill 16 is fashioned with a transverse kerf 68 which, for example, may be formed by a transverse saw cut made in the sill. The lower inclined plate 24 of the framing anchor 22 has one or more shear tabs 70 extending downwardly into the kerf to prevent the framing anchor from slipping along the length of the sill.

Referring now to FIGS. 7-11, an alternate embodiment of a framing anchor constructed in accordance with the present invention is illustrated generally by the numeral 22'. The modified framing anchor 22' is quite similar to the framing anchor 22, and like reference numerals have been applied to the corresponding parts.

Referring to FIG. 7, it will be noted that, in the modified framing anchor 22', the first upwardly extending flange 50 and the second upwardly extending flange 56 are formed without the tabs 52, 54 and the slots 64, 66 respectively of the embodiment of FIGS. 1-6.

As best illustrated in FIGS. 8-11, modified locking means 72 is provided for integrally locking the lower inclined plate 24 to the upper horizontal plate 26 independently of the underpinning 20. The locking means includes a clip 73 coupled to each corner of the upper horizontal plate on the side thereof opposite the flexible interconnecting section 28. Referring to FIG. 9, a clip is shown formed from steel plate, for example by stamping, and includes a flat bottom portion 74, a generally elongate upper tab portion 76 extending upwardly from the flat bottom portion, and an upwardly extending flat side portion 78 interconnecting the tab and the bottom portion and defining therewith an integral corner 80. The side portion further includes a generally upwardly extending ear 82 having a prepunched hole 84 formed in the end thereof through which nails 44 may be driven into the underpinning.

As best illustrated in FIGS. 8, 10 and 11, the clips 72 are fitted to the corners of the upper horizontal plate 26 with the flat bottom portion 74 of each clip positioned adjacent the bottom of the horizontal plate, the side portion 78 and integrally formed ear 82 positioned adjacent each of the spaced upwardly projecting flanges 32 and having the hole 84 concentrically aligned with one of the holes 42 formed therein for receiving one of the nails 44. The elongate upper tab portion 76 extends upwardly along the underpinning and the upwardly extending flange 56 is hammered into position adjacent the clip and the underpinning. The elongate upper tab portion is then bent over the upwardly extending flange to integrally lock the lower inclined plate to the upper horizontal plate to form the load supporting truss 48.

The framing anchor 22 or 22' may be installed as follows:

The lower inclined plate 24 of the framing anchor 22/22' is placed on the upper surface of the sill 16 having the shear tabs 70 positioned within the kerf 68 to prevent the framing anchor from slipping along the length of the sill. The depending flanges 30 are struck by hammer and formed inwardly so as to impinge on opposite sides of the sill with the tubular projection 34 driven into the sill. Thereafter nails 38 are driven through the holes 36 into the sill.

Next, the underpinning 20 is placed in the framing anchor 22/22' so that its lower end will rest on the upper plate 26 in abutment with the first upwardly extending flange 50 to correctly center the underpinning relative to the upper plate. In the embodiment shown in FIGS. 1-6, the upwardly projecting flanges 32 are hammered against the underpinning, driving the tubular projection 40 therein, and then nails 44 are driven through the holes 42 into the underpinning. Alternately, with the embodiment of FIGS. 7-11, after the upwardly-projecting flanges are hammered against the underpinning, each of the clips 72 are positioned over the respective corners of the flanges with the upper plate, and one of the nails 44 is driven through the aligned holes 42 and 84.

Due to the variation of angles desired between the lower plate 24 and the upper plate 26, it would be seldom found that the underpinning 16 was in vertical alignment at this point of installation and this would necessitate exerting a lateral force against the underpinning, forcing the framing anchor to bend at the flexible interconnecting section 28 as required to achieve vertical alignment of the underpinning.

Finally, the second upwardly extending flange 56 is struck with a hammer and formed into a position adjacent the underpinning and the first flange and tabs of the framing anchor 22, or adjacent the underpinning, the flange, and the clips 72 of the framing anchor 22'. Then nails 62 are driven through the holes 60 in the second flange and into the underpinning. Thereafter the tabs disclosed in either embodiment of the invention are bent into the slots 64 and 66 and over the second flange 56, as shown in FIG. 3, or alternatively, as illustrated in FIG. 11, over the upwardly extending flange.

While the present invention has been described with reference to two embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention include all embodiments falling within the scope of the appended claims.

I claim:

1. In a framing anchor for securing the lower end of a vertical underpinning to a sill mounted on a concrete footing of a foundation embedded in the ground to support a building structure, said footing defining a sloping top surface corresponding generally to the slope of the ground in which said footing is disposed, said framing anchor being adjustable so that the underpinning may be held in a vertical position even though the top surface of said foundation may be varied in its angle of slope, said framing anchor including a lower inclined plate resting on the top of said sill and an upper horizontal plate having the lower end of said vertical underpinning resting thereon, said lower and upper plates being joined together at one side of said framing anchor by a flexible interconnecting section, the improvement comprising:
   means for integrally locking said lower inclined plate to said upper horizontal plate independently of said underpinning including:
   at least one upwardly extending tab integrally connected with said upper horizontal plate on the side thereof opposite said flexible interconnecting section, said tab having said lower end of said underpinning abutted thereagainst; and
   an upwardly extending flange formed integrally with said lower inclined plate on the side thereof opposite said flexible interconnecting section, said upwardly extending flange being positioned adjacent said underpinning and in a juxtaposed relationship with said tab, said tab being bendable over said second upwardly extending flange.

2. In a framing anchor for securing the lower end of a vertical underpinning to a sill mounted on a concrete footing of a foundation embedded in the ground to support a building structure, said footing defining a sloping top surface corresponding generally to the slope of the ground in which said footing is disposed, said framing anchor being adjustable so that said underpinning may be held in a vertical position even though the top surface of said foundation may be varied in its angle of slope, said framing anchor including a lower inclined plate resting on the top of said sill and an upper horizontal plate having the lower end of said vertical underpinning resting thereon, said lower and upper plates being joined together at one side of said framing anchor by a flexible interconnecting section, the improvement comprising:
   means for integrally locking said lower inclined plate to said upper horizontal plate independently of said underpinning including:
   a first upwardly extending flange formed integrally with said upper horizontal plate on the side thereof opposite said flexible interconnecting section, said flange including at least on upwardly extending tab formed integrally therewith, said flange and said tab having said lower end of said underpinning abutted thereagainst as an aid in correctly centering said underpinning relative to said upper plate; and
   a second upwardly extending flange formed integrally with said lower inclined plate on the side thereof opposite said flexible interconnecting section, said second upwardly extending flange being positioned adjacent said first upwardly extending flange and said underpinning in a juxtaposed relationship with said tab of said first upwardly extending flange, said tab being bendable over said second upwardly extending flange.

3. In a framing anchor for securing the lower end of a vertical underpinning to a sill mounted on a concrete footing of a foundation embedded in the ground to support a building structure, said footing defining a sloping top surface corresponding generally to the slope of the ground in which said footing is disposed, said framing anchor being adjustable so that said underpinning may be held in a vertical position even though the top surface of said foundation may be varied in its angle of slope, said framing anchor including a lower inclined plate resting on the top of said sill and an upper horizontal plate having the lower end of said vertical underpinning resting thereon, said lower and upper plates being joined together at one side of said framing anchor by a flexible interconnecting section, the improvement comprising:

means for integrally locking said lower inclined plate to said upper horizontal plate independently of said underpinning including:

a first upwardly extending flange formed integrally with said upper horizontal plate on the side thereof opposite said flexible interconnecting section, said flange including at least one upwardly extending tab formed integrally therewith, said flange and said tab having said lower end of said underpinning abutted thereagainst as an aid in correctly centering said underspinning relative to said upper plate; and a second upwardly extending flange formed integrally with said lower inclined plate on the side thereof opposite said flexible interconnecting section, said second upwardly extending flange being positioned adjacent said first upwardly extending flange and said underpinning and defining at least one slot, said slot being positioned in a juxtaposed relationship with said tab of said first upwardly extending flange, said tab being bendable into said slot and over said second upwardly extending flange.

4. The improvement of claim 3 wherein the locking means further includes:

a plurality of upwardly extending tabs formed integrally with the first upwardly extending flange, and a plurality of slots defined by the second upwardly extending flange, each of the plurality of slots being positioned in a juxtaposed relationship with one of the plurality of tabs, each of the plurality of tabs being bendable into one of the plurality of slots and over the second upwardly extending flange.

* * * * *

UNITED STATES PATENT AND TRADEMARK OFFICE
CERTIFICATE OF CORRECTION

PATENT NO. : 4,414,785
DATED : November 15, 1983
INVENTOR(S) : VENICE T. HOWELL

It is certified that error appears in the above—identified patent and that said Letters Patent is hereby corrected as shown below:

Column 1, line 13 - change "to", first occurrence, to -- so --.

Column 2, line 1 - change "lowerend" to --lower end--.

Column 5, line 67 - change "ofsaid" to --of said--.

Column 6, line 42 - change "on" to --one--.

Column 7, line 15 - change "underspinning" to --underpinning--.

Signed and Sealed this

Thirty-first Day of January 1984

[SEAL]

Attest:

GERALD J. MOSSINGHOFF

Attesting Officer    Commissioner of Patents and Trademarks